US012089776B2

(12) United States Patent
Lewis et al.

(10) Patent No.: US 12,089,776 B2
(45) Date of Patent: Sep. 17, 2024

(54) NONSTICK COMPOSITE MATERIALS AND MOLDED NONSTICK COOKWARE

(71) Applicant: ADVANCED FLEXIBLE COMPOSITES, INC., Lake In The Hills, IL (US)

(72) Inventors: William Christopher Lewis, St. Charles, IL (US); Jian Gao, St. Charles, IL (US); Barton Roy Lewis, Jr., Algonquin, IL (US); Lambert Allen Terpstra, Crystal Lake, IL (US); Paul A. E. Smith, Cary, IL (US); William James Lewis, Naples, FL (US)

(73) Assignee: ADVANCED FLEXIBLE COMPOSITES, INC., Lake In The Hills, IL (US)

( * ) Notice: Subject to any disclaimer, the term of this patent is extended or adjusted under 35 U.S.C. 154(b) by 1165 days.

(21) Appl. No.: 16/849,040

(22) Filed: Apr. 15, 2020

(65) Prior Publication Data
US 2020/0237141 A1    Jul. 30, 2020

Related U.S. Application Data

(63) Continuation-in-part of application No. PCT/US2019/047249, filed on Aug. 20, 2019.
(Continued)

(51) Int. Cl.
*A47J 36/04*    (2006.01)
*A47J 36/02*    (2006.01)
(Continued)

(52) U.S. Cl.
CPC ............. *A47J 36/04* (2013.01); *A47J 36/025* (2013.01); *A47J 36/16* (2013.01); *A47J 37/108* (2013.01);
(Continued)

(58) Field of Classification Search
CPC .......... B32B 37/226; B32B 3/08; A47J 37/01; A47J 37/10; A47J 36/04; A47J 36/025
See application file for complete search history.

(56) References Cited

U.S. PATENT DOCUMENTS 4,314,559 A  *  2/1982  Allen ..................... A61B 18/14
                                                    606/49
4,541,411 A       9/1985  Woolf
(Continued)

FOREIGN PATENT DOCUMENTS

| EP | 3066927 A1 | 9/2016 |
| WO | WO 92/08609 A2 | 5/1992 |
| WO | WO2010021708 A2 | 2/2010 |

OTHER PUBLICATIONS

Gurarda, Ayca, "The Effects of Seam Parameters on the Stiffness of Woven Fabrics," Tekstil ve Konfeksiyon, Jul. 1, 2009, vol. 19.1, pp. 242-247 (6 pages).
(Continued)

*Primary Examiner* — Michael M Dollinger
(74) *Attorney, Agent, or Firm* — Pauley Erickson & Swanson

(57) ABSTRACT

Heat resistant and/or nonstick polymer materials and composites, and cookware including a food support surface comprising an integrated or attached cooking surface formed of the materials and composites. The cookware includes a laminate material with structural rigidity, wherein the laminate material includes a flexible substrate impregnated with the heat resistant polymer material and/or coated with a nonstick coating, and pressed or molded in a shaped cookware or other nonstick items or component. Various cooking devices can be pressed from the material, as well as oven or vehicle components.

11 Claims, 10 Drawing Sheets

Related U.S. Application Data

(60) Provisional application No. 62/834,189, filed on Apr. 15, 2019, provisional application No. 62/829,706, filed on Apr. 5, 2019, provisional application No. 62/719,799, filed on Aug. 20, 2018.

(51) Int. Cl.
  *A47J 36/16* (2006.01)
  *A47J 37/10* (2006.01)
  *B32B 3/08* (2006.01)
  *B32B 5/02* (2006.01)
  *B32B 27/08* (2006.01)
  *B32B 27/12* (2006.01)
  *B32B 27/32* (2006.01)
  *B32B 37/10* (2006.01)

(52) U.S. Cl.
  CPC ............... *B32B 3/08* (2013.01); *B32B 5/024* (2013.01); *B32B 27/08* (2013.01); *B32B 27/12* (2013.01); *B32B 27/322* (2013.01); *B32B 37/10* (2013.01); *B32B 2255/10* (2013.01); *B32B 2255/26* (2013.01); *B32B 2262/101* (2013.01)

(56) References Cited

U.S. PATENT DOCUMENTS

| | | | |
|---|---|---|---|
| 4,610,918 A | 9/1986 | Effenberger et al. | |
| 5,141,800 A | 8/1992 | Effenberger et al. | |
| 5,240,775 A | 8/1993 | Tannenbaum | |
| 5,885,281 A * | 3/1999 | Urueta | A61B 18/1402 606/41 |
| 6,761,964 B2 | 7/2004 | Tannenbaum | |
| 8,642,171 B2 | 2/2014 | Liu | |
| 8,714,398 B2 | 5/2014 | Lewis et al. | |
| 2002/0043525 A1* | 4/2002 | Laken | B29C 51/02 219/386 |
| 2006/0134404 A1 | 6/2006 | Witsch | |
| 2008/0178747 A1 | 7/2008 | Baker et al. | |
| 2009/0110935 A1 | 4/2009 | Lewis et al. | |
| 2011/0146501 A1 | 6/2011 | Woerner et al. | |
| 2011/0311701 A1* | 12/2011 | Lewis | A23L 5/15 220/573.1 |
| 2013/0277374 A1 | 10/2013 | Lewis et al. | |
| 2015/0144261 A1 | 5/2015 | Thornton et al. | |
| 2017/0245677 A1* | 8/2017 | Cheng | A47J 36/025 |

OTHER PUBLICATIONS

ISA/US, English language version of the International Search Report, Form PCT/ISA/210 for International Application PCT/US2019/047249, Nov. 12, 2019 (3 pages).

ISA/US, English language version of the Written Opinion of the International Searching Authority for International Application PCT/US2019/047249, Nov. 12, 2019 (7 pages).

European Patent Office, Supplementary European Search Report, European Patent Application No. EP 20 79 0859, Nov. 7, 2022 (10 pages).

U.S. Patent Office, English language version of the International Search Report, Form PCT/ISA/210 for International Application PCT/US2020/028287, Jul. 24, 2020 (3 pages).

U.S. Patent Office, English language version of the Written Opinion of the ISA, Form PCT/ISA/237 for International Application PCT/US2020/028287, Jul. 24, 2020 (8 pages).

* cited by examiner

NONSTICK COMPOSITE MATERIALS AND MOLDED NONSTICK COOKWARE

CROSS REFERENCE TO RELATED APPLICATION

This application claims priority to, and the benefit of U.S. Patent Application, Ser. No. 62/834,189, filed on 15 Apr. 2019. The provisional application is hereby incorporated by reference herein in its entirety and is made a part hereof, including but not limited to those portions which specifically appear hereinafter.

BACKGROUND OF THE INVENTION

Field of the Invention

This invention is directed to heat resistant polymer materials and product uses thereof, including cookware, particularly nonstick polymer cooking surfaces, materials, composites, and coatings.

Discussion of Related Art

Nonstick cookware, including, without limitation, pots, pans, baking sheets, cake/bread pans, etc., have been popular for commercial and residential use for many years. Exemplary common cookware include fluoropolymer, e.g., polytetrafluoroethylene (PTFE), coated metal cookware. Over time, the polymer coating tends to flake off the metal, or otherwise lose effectiveness due to residue buildup. Residential users tend to simply replace the entire cookware item, and commercial/industrial users often send their cookware for recoating. There is a continuing need for improved nonstick cookware, and for cookware without metal which holds heat after removal from oven leading to uneven cooking.

Polymer coated non-metal cooking sheets and baskets are known for heating foods and toasting sandwiches in ovens. Such temperature resistant sheets or baskets are particularly useful for quickly toasting sandwiches in high speed or rapid cook ovens, such as are available from TurboChef Technologies, Inc. (Carrollton, Texas) and/or Welbilt, Inc. (United Kingdom). High speed ovens typically incorporate several cooking elements, such as selected from hot air, infrared, radiant, conductive, steam, and/or a microwave heating elements.

While being useful for toasting or cooking food items, known polymer coated cooking sheets and/or cooking baskets/trays often lack the desired food support, durability, cleanability, heat dissipation (for proper cooking and/or operator safety), and/or appearance for commercial restaurants, particularly when food is prepared in view of customers. Also, these known sheets and baskets are typically removed from an oven with a pizza paddle or equivalent, which does not generally provide the fully desired stability for the removed sheet or basket. U.S. Pat. No. 8,857,652, incorporated by reference herein, discloses a cooking support to remedy these issues. There is also a continuing need for an improved cooking apparatus and materials for flexibility in cooking various food items in high temperature/high speed ovens.

SUMMARY OF THE INVENTION

A general object of the invention is to provide an improved nonstick materials and products thereof, such as cookware, e.g., a pan, basket, tray, sheet, bakeware, and accessories (e.g., lids, covers, and oven or countertop racks, etc.), particularly for use in high speed, rapid cook, and/or conventional ovens. Embodiments of the apparatus provide for easy placement in and removal from ovens, provide structure to hold and support food items, cool down quickly and do not hold heat (e.g., mostly or fully free of metal), and can withstand temperatures over 375° F. (191° C.) for an indefinite period of time, and more preferably 500° F. (260° C.).

Another general object of the invention is to provide nonstick, reusable cookware/bakeware including at least a polymer cooking surface. The cooking surface can be formed of a 'nonstick' polymer, contain a non-stick additive as part of the polymer matrix, dip or spray coated with a nonstick polymer, and/or be covered with a removable nonstick polymer surface insert. Various polymers are available for these applications.

Embodiments of this invention provide an improved woven/plastic/nonstick laminate material, and that is pressable or otherwise moldable in a forming method to provide shaped cookware or other nonstick items/components, with structural benefits from the pressing.

The invention includes a method of forming nonstick components, including steps of providing at least two laminate layers, each including a flexible substrate coated with a nonstick material; and pressing the at least two laminates together under heat and pressure to form the cookware. The at least two, and desirably at least three, laminates are typically aligned over one another for pressing. The individual laminate layers can have a same or different material, size, shape, and/or configuration, depending on need.

In embodiments of this invention, the pressing desirably produces a raised rim for structural improvement and/or that is necessary for the use of the component. One or more of the laminates can be a rim layer, which extends around a peripheral edge of a further laminate creating a central support surface of only the further laminate. For composites of three laminate layers, each of first laminate and a second laminate of the laminate layers can be a rim layer, wherein the rim layers extend around a peripheral edge of a third laminate of the laminates for edge support and/or creating a central support surface of only the third laminate. In some embodiments, the second laminate is pressed between the first laminate and the third laminate. In one example, the third laminate comprises air flow openings, and is pressed between solid first and second laminates.

The invention further includes a nonstick device including a pressed laminate with structural rigidity of at least two laminate layers pressed or molded together under heat and pressure into a shaped device, wherein each of the laminate layers separately includes a flexible substrate coated with a nonstick coating. The device optionally includes a peripheral raised rim, such as with a first laminate of the laminate layers being a rim layer, wherein the rim layer extends around a peripheral edge of a second laminate of the laminates as an edge support and/or creating a central support surface of only the second laminate.

In one embodiment, the device includes three separate laminate layers pressed together. As one example, each of first laminate and a second laminate of the laminate layers is a rim layer, wherein the rim layers extend around a peripheral edge of a third laminate of the laminates creating a support surface of only the third laminate. The third laminate can be pressed above or between the first laminate or the second laminate.

In embodiments of this invention, the flexible substrate is impregnated with a heat resistant polymer material. The heat resistant polymer material can be a fluoropolymer (e.g., PTFE, FEP, PFA, MFA®, ETFE), a fluoroelastomer, a silicone rubber, a silicone resin, a urethane rubber, a urethane resin, a polyketone, a polyether ether ketone (PEEK), a polyamide-imide (PAI), a polyphenylene sulfide (PPS), a polyphenylsulfone (PPSU), a liquid crystal polyester (LCP), a polyether sulfone (PES), an epoxy, quartz, fluorinated materials, such as fluorinated mica, combinations thereof, and/or other nonstick, easy clean materials. The flexible substrate can be a woven substrate, non-woven substrate, open mesh/leno weave substrate, braided substrate, and/or unidirectional fabrics, formed of fiberglass, Kevlar, Nomex, carbon fiber, quartz fiber, PEEK, PAEK, PPS, PES, PPSU, LCP, and/or PAI fibers, or combinations of such fibers or yarns. The nonstick coating is desirably applied over at least a top of the polymer material, preferably PTFE or other nonstick material.

In embodiments of this invention, the device is cookware for holding food items during cooking, including a food support surface comprising a cooking surface of the nonstick coating. The cookware is pressed or molded in the form of a basket, tray, sheet, pan, bowl or cup, plate, cover, or other cookware accessory, and wherein each of the cookware and food support surface is fully free of metal The invention further includes a composite material, including a flexible substrate impregnated with a heat resistant polymer material, wherein the composite material has a structural rigidity when cured. The composite material is pressable or moldable into a predetermined configuration before curing and holds the predetermined configuration with the structural rigidity when cured. The predetermined configuration can be, for example, a consumer good, preferably a cookware item, or machinery components.

Exemplary polymers for laminate embodiments of this invention include engineered resins. Engineered resins and thermoplastics are used today in fabrics and conveyor belts. These are resins typically blended with fluoropolymer and or silicone. The engineered resins are used for barrier or abrasion, not structure, as fluoropolymer or silicone incorporation generally prevents structural use of engineered resin. The material composite of this invention can incorporate 100% engineered resin until the woven glass substrate is sufficiently saturated such that, when molded, the engineered resin is consolidated to create a structural component. Another feature is that the invention bonds a nonstick material, such as a fluoropolymer or silicone to the 100% engineered resin. This provides good bond strength.

The invention includes a composite material, including a flexible substrate impregnated with a heat resistant polymer material and coated with a nonstick coating, wherein the composite material has a structural rigidity when cured. The composite material is pressable or moldable, with one or more layers, into a predetermined configuration before or during curing and holds the predetermined configuration with the structural rigidity when cured. The predetermined configuration is a consumer good, preferably a cookware item, or machinery (e.g. vehicle) component.

Embodiments of this invention include surface coatings, such as applied by spray or dip coating, or as a film or coated fabric. In additional embodiments of this invention, the cooking surface is first dip or spray coated and then covered/laminated with a casted or laminate film, or coated fabric, of one or more of, for example: silicone materials and/or fluoropolymers, such as melt-processible fluoropolymers or blends of PTFE and melt-processible fluoropolymers. The spray coating and casted film, etc. desirably interlock together during curing, providing stronger bonding to the underlying cookware surface.

The invention further provides a woven/plastic/nonstick laminate material with structural benefits, and that is pressable or otherwise moldable in a forming method to provide shaped cookware or other nonstick items/components. The material composite of this invention can incorporate a flexible and/or fibrous material impregnated with 100% engineered resin such that, when molded, the engineered resin is consolidated to create a structural component retaining the molded shape.

Other objects and advantages will be apparent to those skilled in the art from the following detailed description taken in conjunction with the appended claims and drawings.

DESCRIPTION OF THE INVENTION

The present invention provides an improved woven/nonstick laminate material with structural benefits, and that is pressable or otherwise moldable in a forming method to provide shaped cookware or other nonstick items/components.

The invention provides heat resistant and/or nonstick materials, and products thereof, including cookware including at least a non-stick polymer cooking surface. As used herein, cookware includes, without limitation, various pots, pans, sheets and baskets, and bakeware such as cake/bread pans and cooking sheets, etc., and also components for cooking devices/appliances. The cookware includes a non-stick cooking surface formed of, or otherwise covered/coated by, a polymer material. Suitable polymer materials include, without limitation, silicone and fluoropolymer materials.

The invention includes improved heat resistant materials and products, such as vehicle components and cookware, particularly for use in high speed, rapid cook, and/or high temperature conventional ovens. In several preferred embodiments, the products are fully made of a polymer material, and substantially or completely free of metal, and thus nonmetallic. Any suitable high heat resistant polymer can be used, as described above. References to "nonmetallic" means that the entire formed product, and/or each layer or element, is devoid of metal.

Embodiments of this invention include a pressable laminate material including a flexible substrate coated with a nonstick material. The material to be pressed desirably includes two or more layers of the laminate material, or two different laminate materials, pressed together. The pressing of the planar laminate layers, under high heat and high pressure, into a non-planar shape provides the resulting structure (e.g., a cookware shape, etc.) with a sufficient structural rigidity for use. The materials used, the number of laminate layers, and the intended configuration and shape, all contribute to the structural rigidity and strength of the resulting nonstick device. The desired number of layers, such as three, desirably more than three, for example, four or five, more desirably more than eight, and preferably in some instances at least ten, are laminated with or without the nonstick coating (e.g., substituting another heat resistant polymer for middle layer laminate coating), and then, if needed, covered with the non-stick fluoropolymer film or a coated fabric, etc., to one or both sides of the heavily laminated product.

Figure 1:
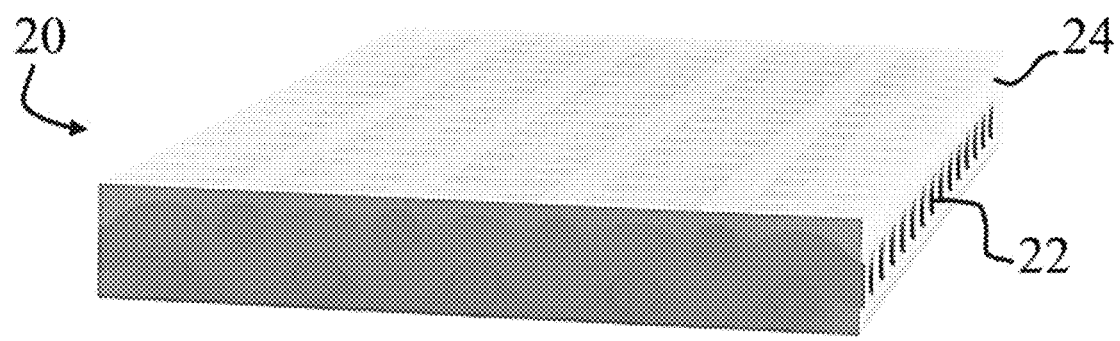
FIG. 1 shows a laminate layer according to one embodiment of this invention.

FIG. 1 shows a laminate material 20 for a laminate layer of embodiments of this invention. The laminate material includes a flexible substrate 22 coated by a heat resistant polymer 24, preferably one that provides a nonstick surface to the coated substrate. Exemplary flexible substrates include woven substrates, non-woven substrates, open mesh/leno weave substrates, braided substrates, and/or unidirectional fabrics, such as made using fiberglass or other suitable fibrous materials, such as Kevlar, Nomex, carbon fiber, quartz fiber, PEEK, PAEK, PPS, PES, PPSU, LCP, and/or PAI fibers, or combinations of such fibers or yarns.

As used herein, "heat resistant" refers to the ability of a material to withstand continuous-use temperatures of about 400° F. (about 204° C.) or greater. The heat resistant polymer can be neat or reinforced, and can include, for example, a fluoropolymer (e.g., PTFE, FEP, PFA, MFA®, ETFE), a fluoroelastomer, a silicone rubber, a silicone resin, a urethane rubber, a urethane resin, a polyketone, a polyether ether ketone (PEEK), a polyamide-imide (PAI), a polyphenylene sulfide (PPS), a polyphenylsulfone (PPSU), a liquid crystal polyester (LCP), a polyether sulfone (PES), an epoxy, quartz, fluorinated materials, such as fluorinated mica, combinations thereof, and/or other nonstick, easy clean materials.

In embodiments of this invention, the polymer 24 is or provides a nonstick coating, such as of the materials disclosed herein, applied over top of the substrate 22, or any optional middle layer. The nonstick coating 24 is desirably capable of being easily cleaned, and is chemical resistant, abrasion resistant, and stain resistant. Exemplary nonstick materials include fluoropolymers and silicone rubbers and resins. Once formed, the composite material can desirably withstand temperatures of greater than 375° F. (191° C.) continuous, and up to 800° F. (426° C.), depending upon the engineered resin utilized. The polymer 24 and/or the nonstick coating can be applied over the substrate by 22, for example, dip, spray, curtain, or powder coating. The nonstick coating surface can alternatively be applied by laminating a cast, extruded, skived, or PTFE coated fabric to the surface of any intermediate polymer material. The nonstick coating can be applied before forming or after forming a press-molded part, described further below.

In embodiments of this invention, a microwave absorbent material or coating can be applied before the coating polymer 24 is applied, or as a component of the coating polymer/nonstick surface application. This can be applied as a coating or laminated material, in same manner as mentioned above.

The composite materials of embodiments of this invention are useful in forming press-molded objects, such as consumer goods and cookware. According to some embodiments of this invention, the forming process begins with a substrate, such as a woven fiberglass substrate, which can include plies of coated linear strand fiberglass. The substrate can optionally be saturation coated with a solution of dissolved or suspended plastic, such as PAI, PPS, PEEK, PPSU, PES, or combinations thereof, or other suitable plastics known for high temperature use. Multi-pass applications of the coating can be used to adequately saturate the fibers, and build adequate weight for flow and forming. The plastic coated substrate is preferably dried and prepared to a pre-preg (pre-impregnated) condition, similar to that performed for epoxy resins on fiberglass used in printed circuit boards.

A top coat of PTFE or other nonstick material is applied to one or both sides. The fluoropolymer coating provides mold release functionalities during forming, and provides a high performance release finish for cooking (similar to pan coatings). The coating can be applied by, for example, a heavily coated single ply coating and/or multi-ply lamination of lighter weight woven or linear strand fiberglass.

The dried, but not cured, composite material can be wound into a roll and stored for further processing from the roll into an automated forming press, or sheeted to discrete sizes for manually loading into a press. The forming presses typically include heated platens to which male and female forming dies are attached, with temperatures generally adjustable to 600° F. (315° C.) or higher. The pressed structure is typically formed at a temperature at or above the glass transition temperature (Tg) of one or more of the materials. Pressures are also generally adjustable and vary according to size. Testing has shown reasonable results as low as 30 psi in an air load press capable of 3 tons total applied pressure. Larger part sizes and multiple part molds may require significantly more pressure. Matched form molds, or coining, is a form of compression molding requiring higher pressures; for proposed objects of this invention, 30- to 50-ton hydraulic presses are likely needed.

After forming the edges may be trimmed in a die cutting station, such as "steel rule die" or "clicker press". The formed parts can be post cured in a batch oven with a stepped temperature cycle to obtain higher operating temperatures and to cure the PTFE and enhance the bond of the PTFE to the tray. The post forming processing can be used to crosslink, chain extend, or otherwise cure additionally included polymer materials, such as an engineered resin. Also, the additional polymer material could be post-cured to temperatures capable of fusing with the fluoropolymers.

As will be appreciated, various and alternative post pressing treatments are available depending on need and/or final product use. For some components, a multi-step forming process is used. As an example, some vehicle/aircraft components can be pressed, heat cleaned (cooked/bleached), die cut, and then pressed a second time before any final curing. In another example, for making rods or pegs, a laminate of desired thickness is pressed flat, then cut into square rods, each then machined (drill, tap, mill, lathe, cut, etc) into a cylindrical rod, then final processed into the end part. In some embodiments of this invention, laminations greater than approximately four layers may need to be pre-pressed flat, then shaped by some manipulation and/or machining process. This can be used to form the "taco trays" and/or "wave trays" shown herein below. As another example, laminates can be machined to expose middle layers before final coating on the exposed layers.

In embodiments of this invention, the material can be cured during the molding process if molding is done at high enough temperature. Another option is to post cure in an inline process such as a hot air or infrared oven on a conveyor. In embodiments of this invention, molding is performed between 600° F. (315° C.) (and preferably 640° F. (338° C.)) and 800° F. (426° C.). At these temperatures, the process can complete and no post cure is needed. The higher temperature allows the fluoropolymer to cure at a same time as molding and thus reduces the need for post cure.

In embodiments of this invention the composite is formed including a woven substrate of a high temperature thermoplastic material (e.g., capable of continuous operation at temperatures of 375° F. (191° C.) or higher), such as PEEK, PAEK, PPS, PES, PPSU, LCP, and/or PAI, that can be coated with additional compatible thermoplastic material, and that coating could include chopped fiber or other reinforcement and then the material could be top coated with a nonstick surface.

Also, for additional dimensional strength, a non-woven, woven, or unidirectional fabric consisting of a reinforcement material capable of withstanding the operating temperatures of 375° F. (191° C.) or higher continuously could be laminated to a thermoplastic woven material before or during the additional coating passes mentioned above.

The pressed composites of embodiments of this invention desirably have or include a rigid molded shape, and are insulative in nature (i.e., does not want to conduct heat), durable, nonstick, low friction, cleanable, chemical resistant, corrosion resistant, heat resistant, and/or capable of bleeding heat quickly. Also, desirably, the substrate weave is capable of conforming to shapes during a compression or thermoforming process such that it will not tear, wrinkle, or fold. The composite material and forming of this invention are useful in cookware and cooking appliance components such as, without limitation, bakeware, microwave applications, and oven cooking (convention, conveyor, rapid cook, brick/stone, accelerated cooking, etc.). The composite material and forming of this invention are useful in other consumer or industrial goods/applications, and/or automotive applications such as, without limitation, providing corrosion and/or chemical resistance or thermal resistance or insulation to parts, such as tubing, fluid containers, oil pans, and/or exhaust parts. These properties also make the material useful in forming aerospace and/or defense parts.

Figure 2:
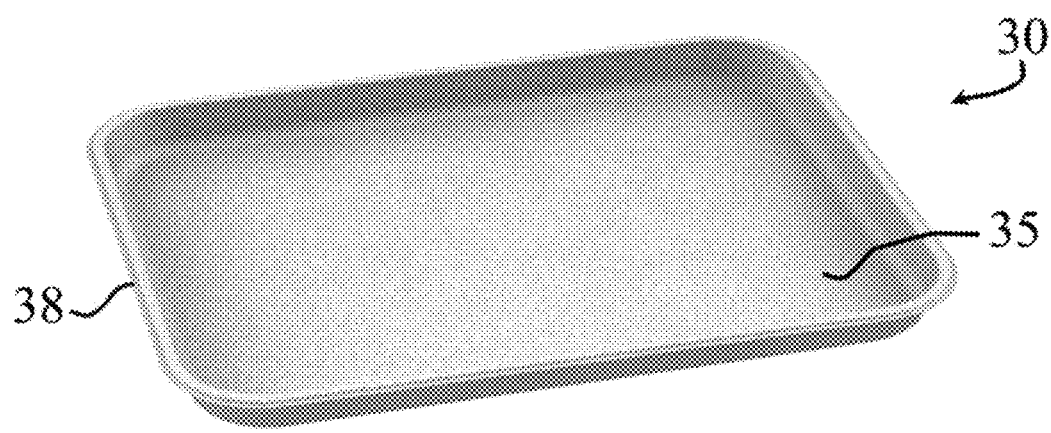
FIGS. 2 and 3 show a cookware device according to one embodiment of this invention.
Figure 3:

FIG. 2 shows a cookware composite 30, namely a non-porous (solid surface) cooking sheet or pan. As shown in the exploded view of FIG. 3, the cookware composite 30 is formed from pressing together three separate laminate layers 32, 34, and 36. The three laminate layers 32-36 can be the same or different laminate materials. For example, each can be a fluoropolymer coated flexible substrate, providing nonstick planar cooking surface 35. Alternatively, for example, the middle laminate layer 34 can include a different polymer material, optionally without the nonstick material, to promote layer adhesion during pressing. As another alternative, a non-stick coating can be separately applied to the laminate composite during or after pressing.

Figure 6:
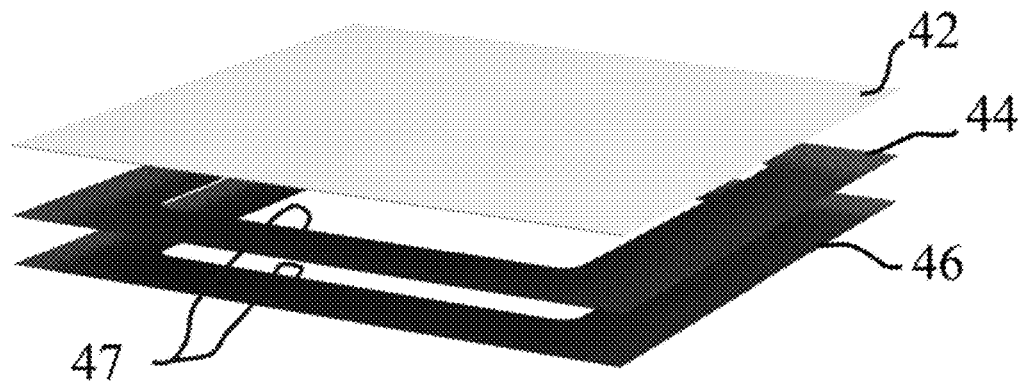
FIGS. 6-8 illustrate a pressing method according to one embodiment of this invention.

Each of the three laminate layers 32-36 began as a planar sheet (FIG. 6). Pressing formed a cookware shape, having raised rim 38. The raised rim 38, extending fully around the peripheral edge, provides a cookware edge structure to maintain food and/or promote handling, as well as provides additional structural rigidity to the device. As will be appreciated, various sizes, shapes, materials, and number of laminate layers are available for such a device, depending on need.

Figure 4:
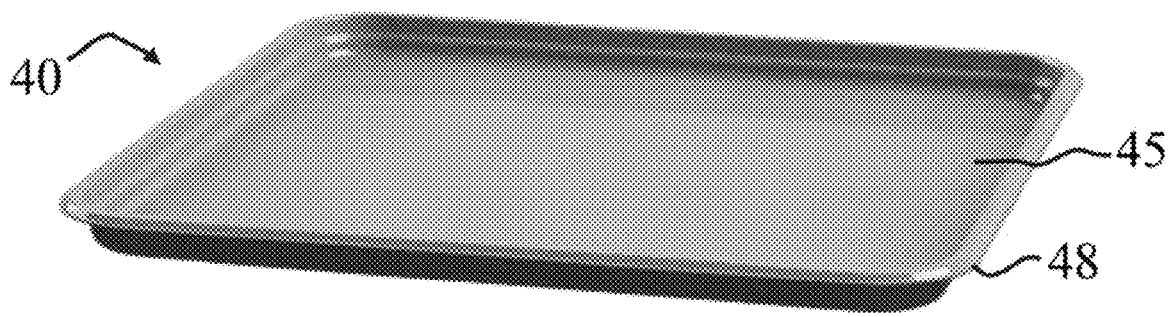
FIGS. 4 and 5 show a cookware device according to another embodiment of this invention.
Figure 5:

FIG. 4 illustrates another cookware composite 40, shown with a similar shape as composite 30, but having a different laminate construction. As shown in the exploded view of FIG. 5 A first, or top, laminate layer 42 is solid to provide planar cooking surface 45, but both second laminate layer 44 and third laminate layer 46 have an 'edge-only' configuration, with a center cutout 47. Laminate layers 44 and 46 are rim layers that provide structural support, particularly for the raised rim 48 area, while leaving a single ply food contact area 45 for enhanced cooking performance due to less mass in the sheet/tray device 40.

Figure 7:
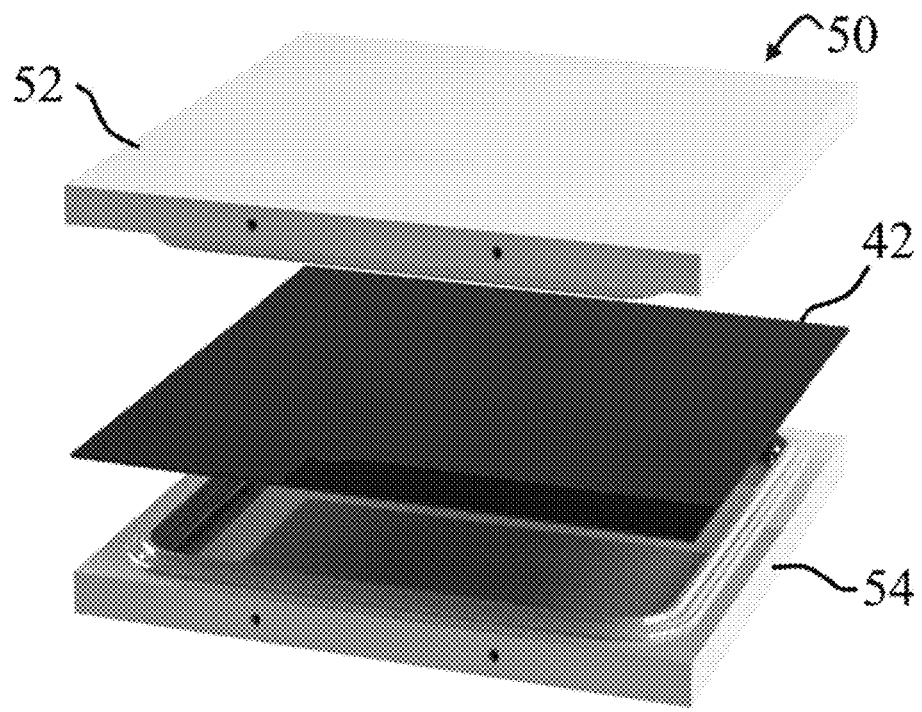
Figure 8:
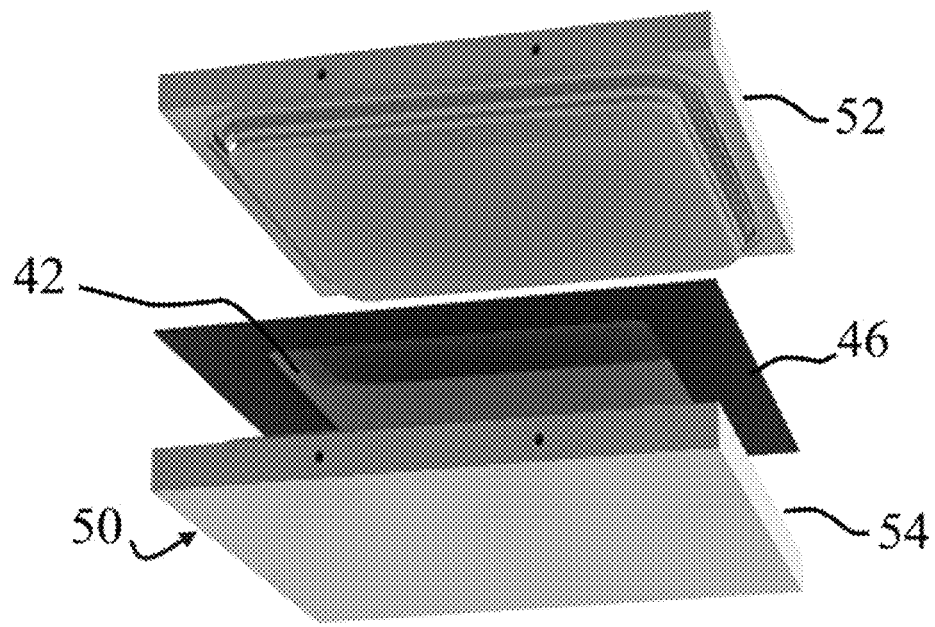

FIGS. 6-8 illustrate a forming method of the composite 40. In FIG. 6, the three laminate layers 42-46 are stacked in the planar sheet form. The laminate layers 42-46 can be any suitable laminate, such as E-glass and S-glass coated with fluoropolymers (e.g., PTFE), and are pre-sized/shaped as needed, such as by cutting or similar technique. The pre-assembled, stacked laminates are added to the press device 50, shown in FIGS. 7 and 8 from different angles. The upper and lower press plates 52 and 54, have a shape to provide the raised rim 48 during pressing. In embodiments, the pressing force is greater than 1 ton of pressure, at temperatures greater than 600° F. (about 315° C.), desirably greater than 630° F. (about 332° C.). The composites can be punched to size after the heated and pressurized lamination process via, for example, a clicker press and/or pre-manufactured punch dies.

Figure 9:
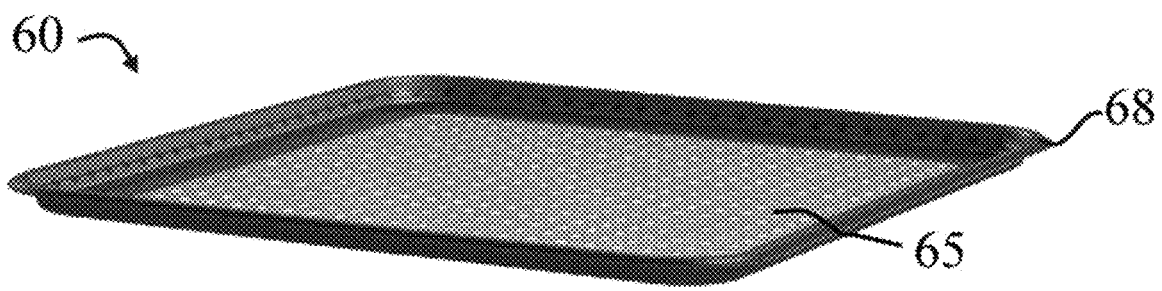
FIGS. 9 and 10 show a cookware device according to another embodiment of this invention.
Figure 10:
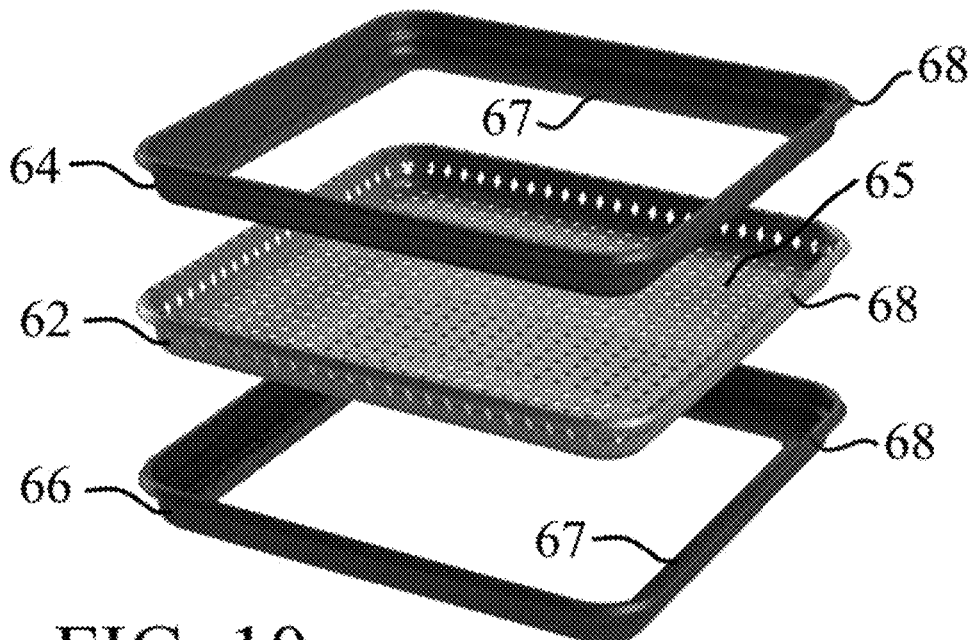

FIG. 9 illustrates another cookware composite 60, shown as a square tray or basket, but having yet another laminate construction. As shown in the exploded view of FIG. 10, a middle laminate layer 62 has an open mesh to provide improved air flow for improved cooking. The middle laminate is disposed between upper and lower laminate layers 64 and 66 each having a solid/non-mesh 'edge-only' configuration, with a center cutout 67. Laminate layers 64 and 66 likewise provide structural support, particularly in the raised rim 68 area, while leaving a single ply mesh food contact area 65 for enhanced cooking performance. In addition, the sandwiched mesh layer improves aesthetics and tactic feel in the raised rim 68.

Figure 11:
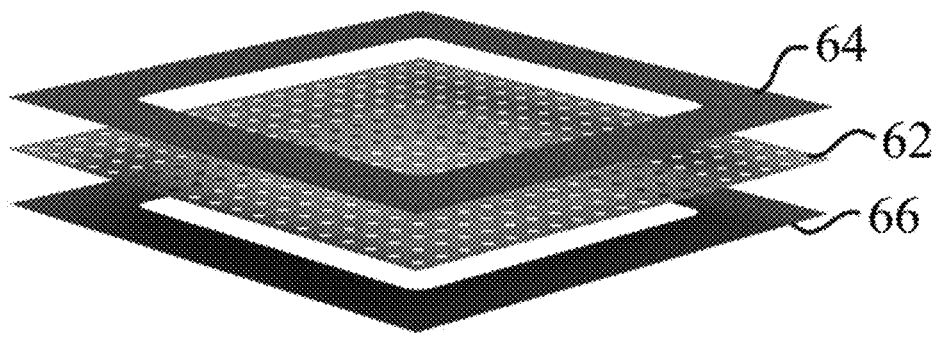
FIGS. 11-13 illustrate a pressing method according to one embodiment of this invention.
Figure 12:
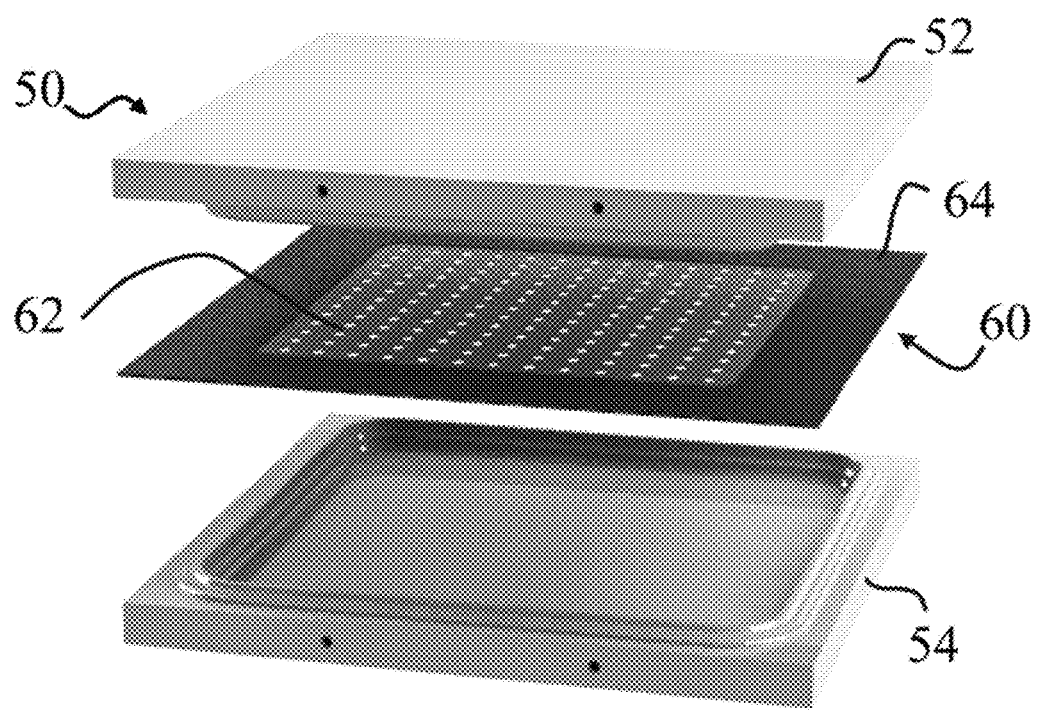
Figure 13:
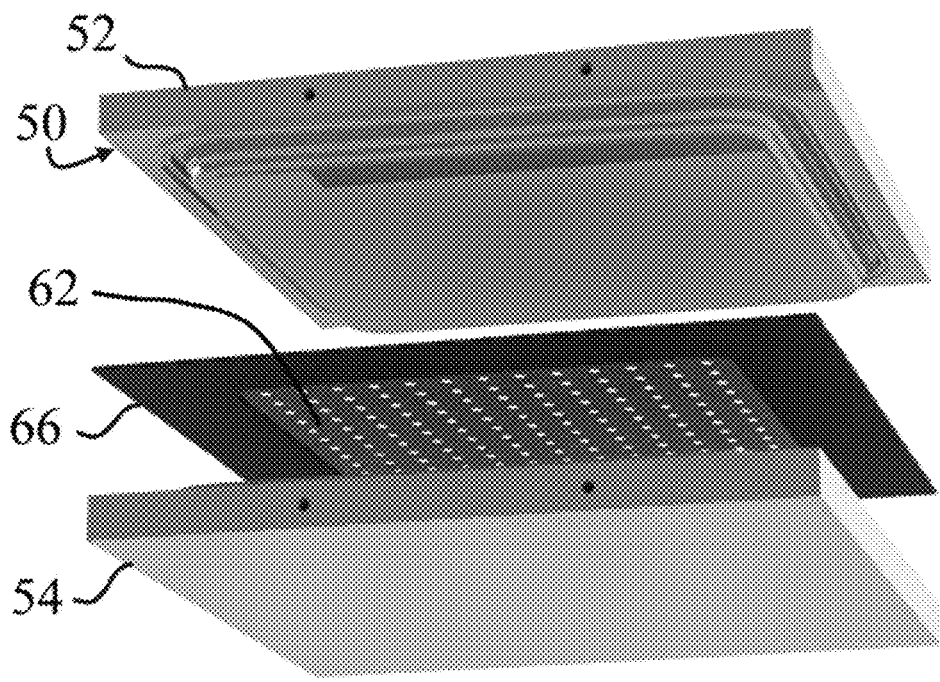

FIGS. 11-13 illustrate a forming method of the composite 60. In FIG. 11, the three laminate layers 62-66 are stacked in the planar sheet form. The pre-assembled, stacked laminates are added to the press device 50, shown in FIGS. 12 and 13, again from different angles. The upper and lower press plates 52 and 54, have a shape to provide the raised rim 68 during pressing.

In embodiments of this invention, one or more of the individual laminate layer composite of this invention can incorporate 100% engineered resin. The engineered resin can be applied to the flexible substrate until the substrate is sufficiently saturated such that, when molded, the engineered resin is consolidated to create a structural component. The invention further bonds an outer layer of fluoropolymer or silicone to the 100% engineered resin. This is easily done and with good bond strength.

Figure 14:
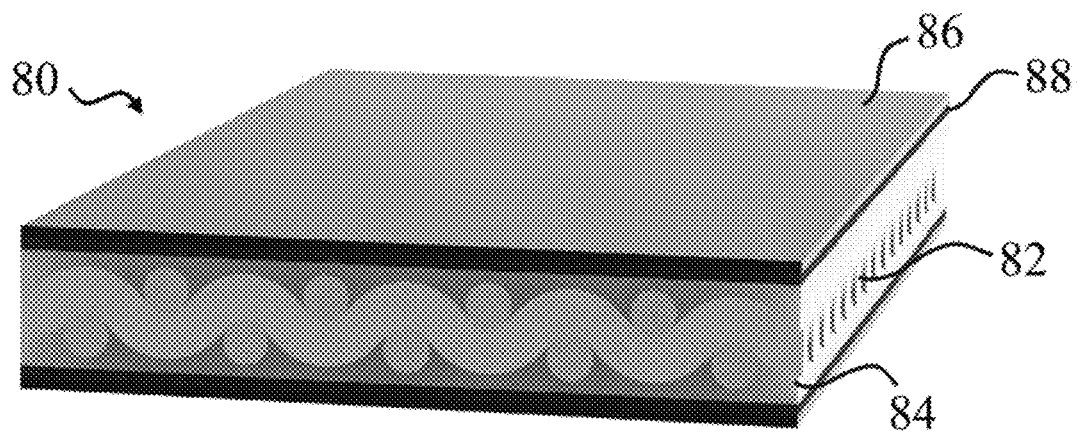
FIGS. 14-15 shows a composite material, according to one embodiment of this invention.
Figure 15:
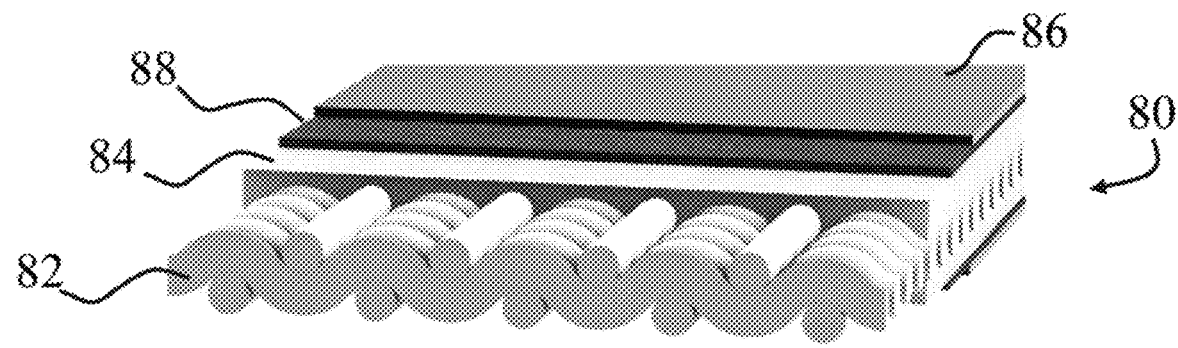
Figure 16:
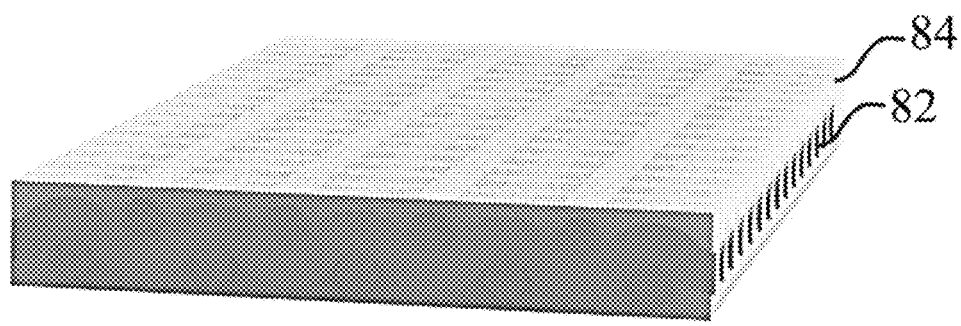
FIGS. 16-17 shows the layers and building of the composite material of FIGS. 14-15.

Embodiments of this invention provides high temperature (≥375° F.) resistant, formable composites. As shown in FIGS. 14 and 15, a composite 80 can be formed by impregnating and/or coating one or more substrates 82 with a plastic material 84, as shown in FIG. 16. Exemplary flexible substrates include woven substrates, non-woven substrates, open mesh/leno weave substrates, braided substrates, and/or unidirectional fabrics, such as made using fiberglass or other suitable fibrous materials, such as Kevlar, Nomex, carbon fiber, quartz fiber, PEEK, PAEK, PPS, PES, PPSU, LCP, and/or PAI fibers, or combinations of such fibers or yarns. Exemplary plastic materials include engineered thermoplastic materials and blends thereof. The engineered thermoplastic desirably acts as a support and structure for the composite once molded.

A nonstick coating 86 can be applied over the engineered resin 84 by, for example, dip, spray, curtain, or powder coating. The nonstick coating 86 surface can be applied by laminating a cast, extruded, skived, or PTFE coated fabric to the surface of the engineered resin. The nonstick coating 86 can be applied before forming or after forming a molded part, described further below.

Figure 17:
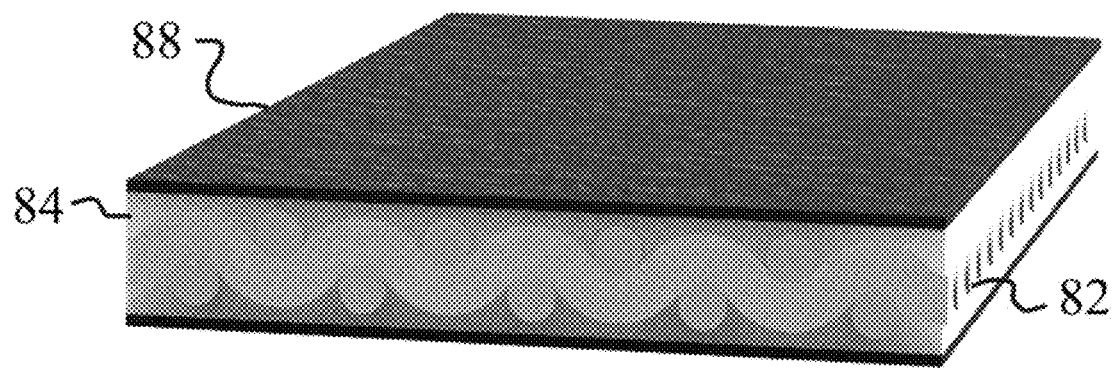

In embodiments of this invention, a microwave absorbent material or coating 88 can be applied before the nonstick coating 86 is applied, as shown in FIG. 17, or as a component of the nonstick surface application. As with the nonstick coating 86 application, this can be applied as a coating or laminated material, in same manner as mentioned above.

Figure 18:
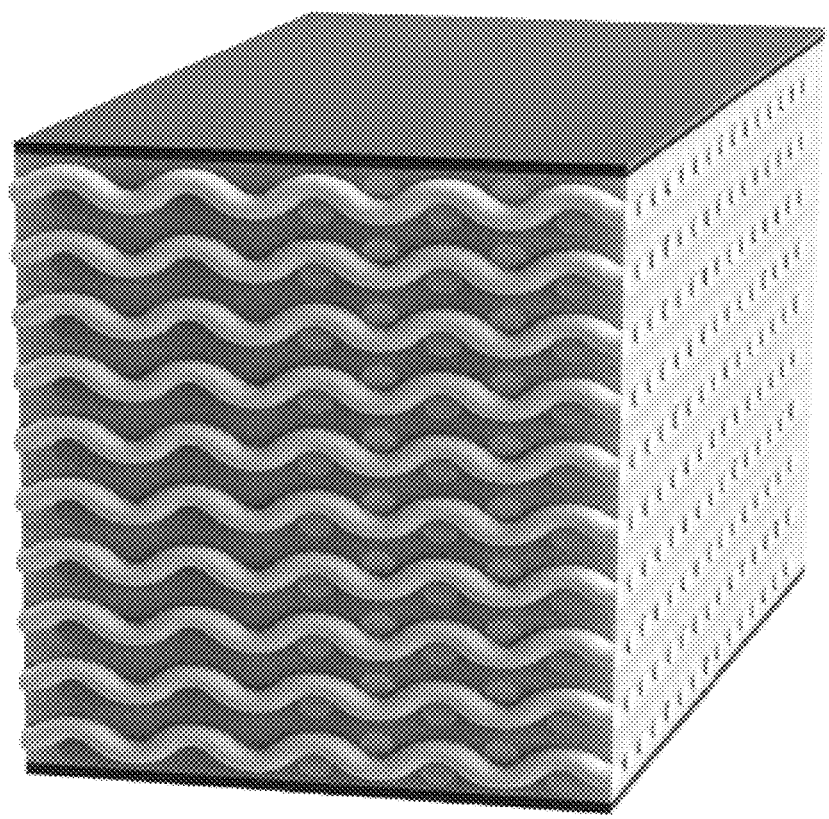
FIG. 18 shows a multilayered composite material, according to one embodiment of this invention FIG. 19-22 each show an exemplary molded cookware, according to embodiments of this invention.

Various and alternative sizes, shapes, and configurations are available for the plastic impregnated/coated substrate. For example, more than one substrate layer can be impregnated. In addition, more than one separately impregnated substrate can be laminated together prior to top coating. The multiple layers can be the same or different substrate materials, such as, for example, a coated woven can be laminated to a coated nonwoven on one or both sides. The type and number of layers can be adjusted for rigidity, depending on need. For example, FIG. 18 shows a laminate composite with ten layers of resign impregnated substrate, which can provide the desired rigidity for applications such as the oven components of FIGS. 24-27. The desired number of layers, such as more than three, desirably, more than five, more desirably more than eight, and preferably at least ten, are laminated without the nonstick coating, and then, if needed, covered with the non-stick fluoropolymer film or a coated fabric, etc., to one or both sides of the heavily laminated product.

Figure 19:
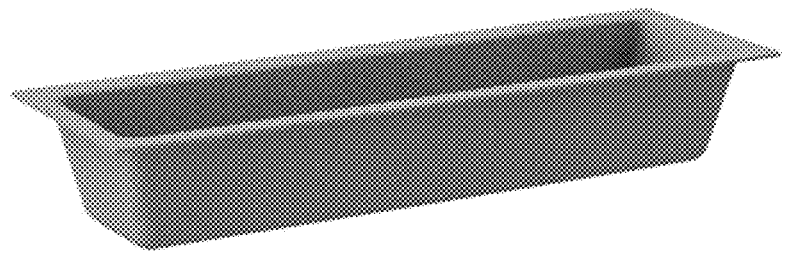
Figure 20:
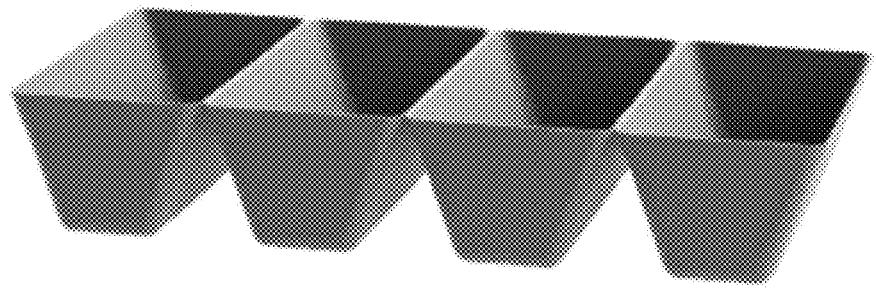
Figure 21:
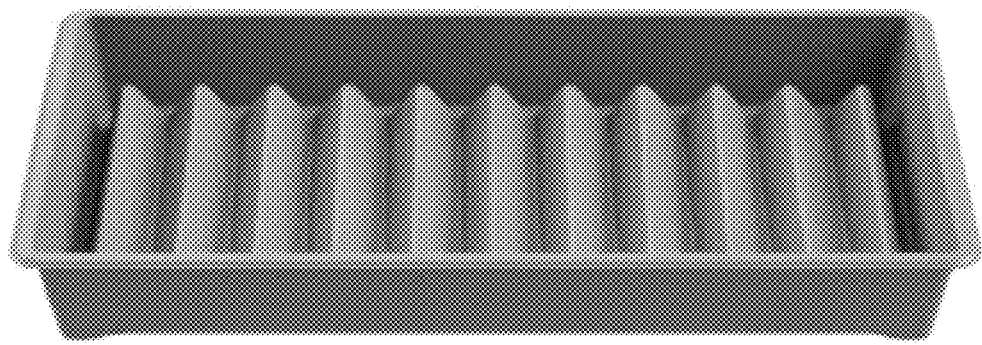
Figure 22:
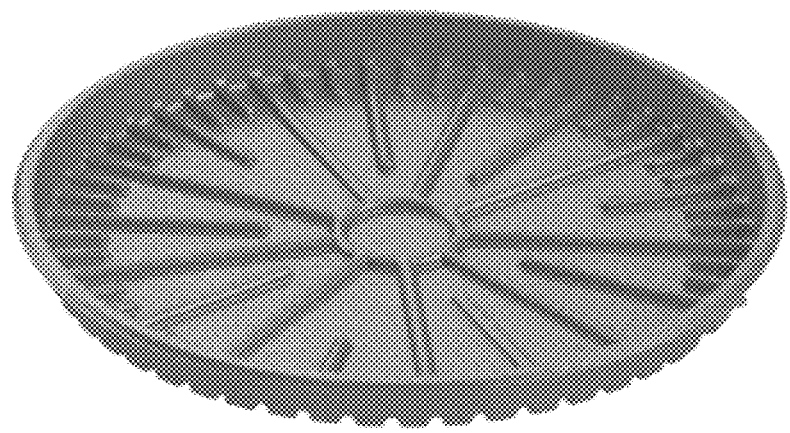
Figure 23:
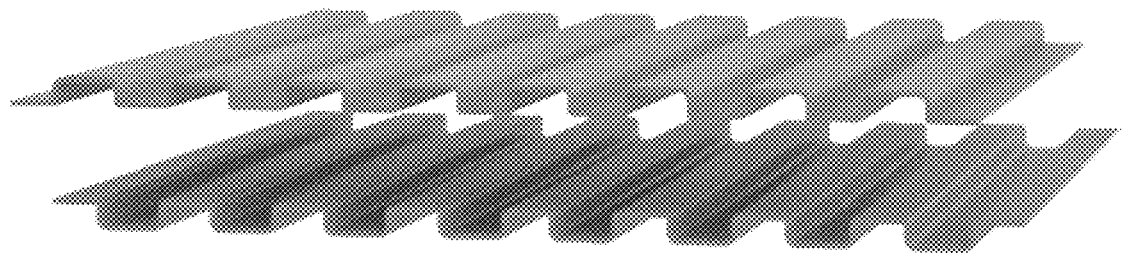
FIG. 23 shows a panini press surface, according to an embodiment of this invention.

Exemplary cookware pressed or molded from any of the laminate materials of this invention include cooking sheets or trays, such as discussed above, bread or cake pans, such as shown in FIG. 19. Other exemplary cookware includes egg pans or inserts, cups, bowls, cookie sheets, pizza pans, panini presses or grill pans, muffin pans, croissant pans, cake pans, pie pans, plates, covers, or other cookware accessory. FIG. 20 is a pressed bread-proofing tray or pan, including a plurality of proofing wells. FIG. 21 is a taco tray, including a pressed undulating surface, each V-shaped well for holding a taco. The tray is shown with side walls, but can be formed without, or with any side structure. FIG. 22 shows a pressed pizza pan, including an exemplary ribbed cooking surface. FIG. 23 shows a panini press surface, including an undulating or other ribbed surface. The panini press surface can be incorporated into a panini press to impart nonstick benefits.

Figure 24:
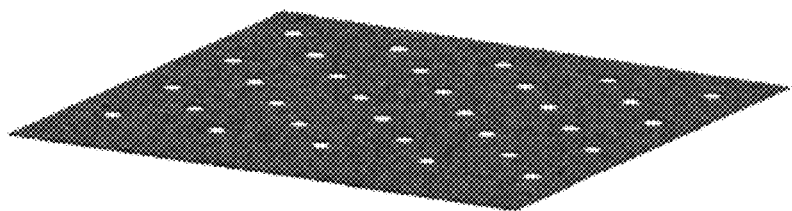
FIGS. 24-27 illustrate molded cookware components, preferably as cooking appliance components, according to embodiments of this invention.
Figure 25:
Figure 26:
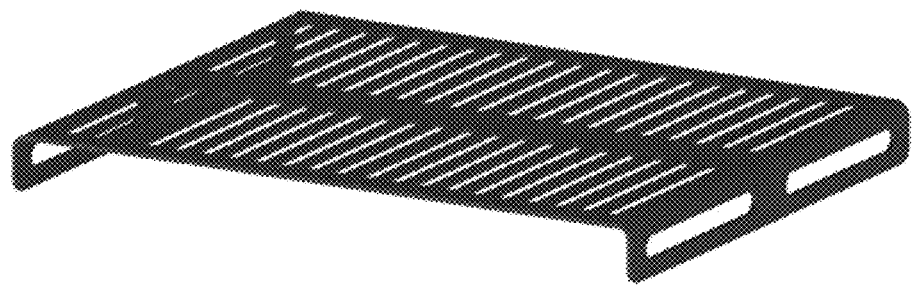
Figure 27:
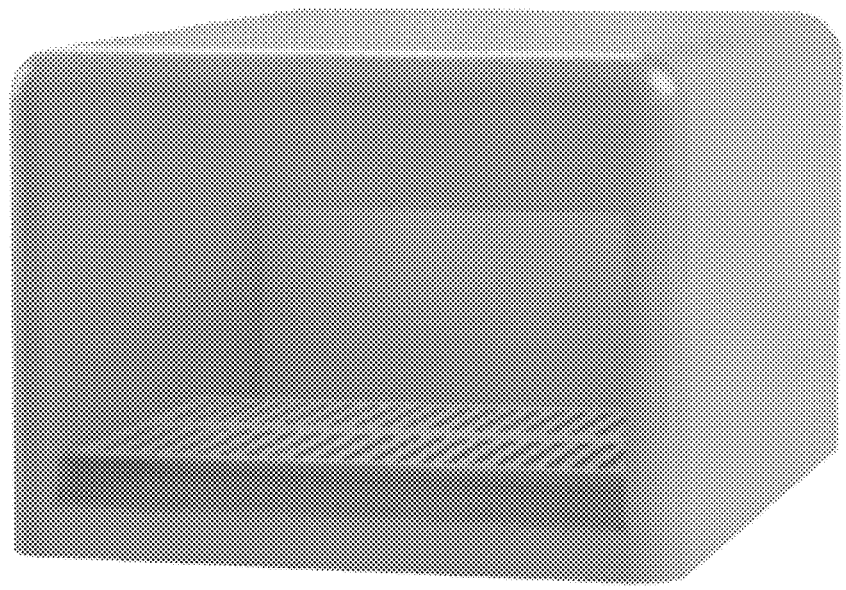

Cookware of this invention further includes cooking components, such as appliance components, preferably, but without limitation, oven, fryer, or toaster components. FIG. 24 shows an oven rack or other shelf structure. FIG. 25 shows a rail or bar that could be used in an oven, but not necessarily in direct contact with the food. Using the material of this invention to form oven components can provide the oven, etc. with easier cleaning, due to the nonstick surface. FIG. 26 shows an oven or toaster rack, and FIG. 27 shows the rack within a representative oven.

Thus, the invention provides a laminate composite material that is formable by heated press or other stamp/press molding. By this invention, the nonstick coating can be applied prior to forming, thereby providing an efficient forming process, and allowing for storing and transfer of the material prior to pressing, stamping or otherwise molding.

The invention illustratively disclosed herein suitably may be practiced in the absence of any element, part, step, component, or ingredient which is not specifically disclosed herein.

While in the foregoing detailed description this invention has been described in relation to certain preferred embodiments thereof, and many details have been set forth for purposes of illustration, it will be apparent to those skilled in the art that the invention is susceptible to additional embodiments and that certain of the details described herein can be varied considerably without departing from the basic principles of the invention. What is claimed is any, some, or all features of novelty described, suggested, referred to, exemplified, or shown herein, and corresponding systems, components, and other devices, and associated methods.

What is claimed is:

1. A method of forming a nonstick component, the method comprising:
   providing at least two flexible substrate layers;
   impregnating each of the at least two flexible substrate layers with a heat resistant thermoplastic material;
   pressing the at least two impregnated flexible substrate layers together between two shaped press plates and under heat and pressure into a laminate to form the component; and
   applying a nonstick material layer to at least one of the impregnated flexible substrate layers during or after the pressing; and
   machining the laminate in a cutting process to form the nonstick component, wherein the machining comprises exposing middle laminate layers and applying a final nonstick coating on exposed layers.

2. The method of claim 1, further comprising aligning the at least two impregnated flexible substrate layers over one another for pressing.

3. The method of claim 1, further comprising pressing the at least two impregnated flexible substrate layers to form a raised rim.

4. The method of claim 3, wherein a first impregnated flexible substrate layer comprises a rim layer, wherein the rim layer extends around a peripheral edge of a second impregnated flexible substrate layer creating a support surface of only the second impregnated flexible substrate layer.

5. The method of claim 1, further comprising pressing three separate impregnated flexible substrate layers together.

6. The method of claim 5, wherein each of first impregnated flexible substrate layer and a second impregnated flexible substrate layer comprises a rim layer, wherein the rim layers extend around a peripheral edge of a third impregnated flexible substrate layer creating a support surface of only the third impregnated flexible substrate layer.

7. The method of claim 5, further comprising pressing the second impregnated flexible substrate layer between the first impregnated flexible substrate layer and the third impregnated flexible substrate layer.

8. The method of claim 6, wherein the third impregnated flexible substrate layer comprises air flow openings, and further comprising pressing the third impregnated flexible substrate layer between the first and second impregnated flexible substrate layers.

9. The method of claim 1, wherein the pressing comprises a pressing force of greater than one ton of pressure and a pressing temperature of greater than 600° F.

10. The method of claim 1, wherein the machining comprises die cutting the laminate or cutting openings in the laminate.

11. The method of claim 1, wherein the machining comprises cutting openings in the laminate.

* * * * *